(12) United States Patent
Nandy et al.

(10) Patent No.: US 9,794,054 B2
(45) Date of Patent: Oct. 17, 2017

(54) DATA ON CLOCK LANE OF SOURCE SYNCHRONOUS LINKS

(71) Applicant: STMicroelectronics International N.V., Schiphol (NL)

(72) Inventors: Tapas Nandy, Delhi (IN); Nitin Gupta, Noida (IN)

(73) Assignee: STMICROELECTRONICS INTERNATIONAL N.V., Schiphol (NL)

(*) Notice: Subject to any disclaimer, the term of this patent is extended or adjusted under 35 U.S.C. 154(b) by 0 days.

(21) Appl. No.: 14/788,721

(22) Filed: Jun. 30, 2015

(65) Prior Publication Data

US 2017/0005780 A1  Jan. 5, 2017

(51) Int. Cl.
| | |
|---|---|
| *H04L 7/00* | (2006.01) |
| *H04L 5/00* | (2006.01) |
| *H04J 3/06* | (2006.01) |
| *H04L 7/033* | (2006.01) |
| *H04L 1/00* | (2006.01) |
| *H04L 7/027* | (2006.01) |
| *G06F 1/10* | (2006.01) |
| *H04L 7/02* | (2006.01) |

(52) U.S. Cl.
CPC .............. *H04L 7/0008* (2013.01); *H04L 5/00* (2013.01); *G06F 1/10* (2013.01); *H04J 3/0685* (2013.01); *H04L 1/0026* (2013.01); *H04L 7/02* (2013.01); *H04L 7/027* (2013.01); *H04L 7/033* (2013.01); *H04L 7/0337* (2013.01)

(58) Field of Classification Search
CPC ....... H04L 7/0008; H04L 7/02; H04L 7/0337; H04L 7/0334; H04L 7/033; H04L 7/027; H04L 1/0026; G06F 1/10; H04J 3/0685
USPC .................................. 375/354–356, 358–359
See application file for complete search history.

(56) References Cited

U.S. PATENT DOCUMENTS

| | | | |
|---|---|---|---|
| 5,723,995 A * | 3/1998 | Mozdzen | ................. G06F 1/10 327/141 |
| 8,798,175 B2 | 8/2014 | Allen | |
| 2003/0021368 A1* | 1/2003 | Yoshizaki | ............. H04L 7/0337 375/354 |
| 2010/0284452 A1* | 11/2010 | Allen | .................... H04L 7/0008 375/220 |

* cited by examiner

*Primary Examiner* — Janice Tieu
(74) *Attorney, Agent, or Firm* — Seed Intellectual Property Law Group LLP (57) ABSTRACT

A source synchronous data transmission system includes a data transmitting device and a data receiving device. A dedicated data line carries a data signal from the data transmission device to the data receiving device. A dedicated clock line carries a modulated clock signal from the data transmission device to the data receiving device. The data transmission device includes a clock data driver configured to encode data into the modulated clock signal by modulating an amplitude of the modulated clock signal. Thus, the clock line of the source synchronous data transmission system carries the clock signal and additional data.

23 Claims, 8 Drawing Sheets

DATA ON CLOCK LANE OF SOURCE SYNCHRONOUS LINKS

BACKGROUND

Technical Field

The present disclosure relates to the field of clock links for data transmission. The present disclosure relates more particularly to the field of source synchronous links and coding data and clocks into the same signal.

Description of the Related Art

Clock circuits regulate transmission of data between components in computer systems, such as between two integrated circuit dies on a printed circuit board.

When data is to be transmitted from a data transmitting device to a data receiving device, data is output from the transmitting device in conjunction with a clock signal generated by a clock signal generator. When the data receiving device receives the data from the data transmitting device, the data receiving device extracts the data in conjunction with the clock signal in order to properly retrieve the data.

Many schemes have been devised for synchronizing a data receiving device with the clock signal by which the data was output from the data transmitting device.

One interchip scheme is a source synchronous clock link in which the data transmitting device transmits data to the receiving device via one or more data lanes. In traditional source synchronous clock schemes, the data transmitting device also transmits the clock signal to the receiving device via a dedicated clock lane. Source synchronous clock schemes are advantageous in that the receiving device can synchronize with the clock signal without complex clock recovery circuitry. However, additional dedicated clock signal lanes connect the transmitting and receiving devices.

BRIEF SUMMARY

One embodiment is to include data and clock information on the very same signal, thus reducing the power required by a chip. It also reduces the unber of output pins needed on a particular chip.

According to one embodiment, the absolute amplitude of a clock signal is modulated to carry data on the clock channels of any source synchronous link. This saves power because otherwise, the clock channel signal will consume power just for be able to output the clock ticks for the of the data channels. This embodiment provides a way to make clock channel also carry data. If there is not data channel at all, the clock channel is sufficient to transmit both data and clock tics at the same time on the same signal line.

One embodiment is a source synchronous data transmission system including a data transmitting device and a data receiving device. The data transmitting device includes a clock signal generator and a clock data driver coupled to the clock signal generator. The clock signal generator generates a clock signal. The clock data driver receives the clock signal and generates a modulated clock signal by modulating an amplitude of the clock signal, thereby encoding data into the modulated clock signal. The variable absolute value of the amplitude of the modulated clock signal reflects the data encoded into the modulated clock signal by the clock driver. The data transmitting device transmits the modulated clock signal to the receiving device on a dedicated clock lane. The data transmitting device can also transmit a data signal with a norma, unmodulated amplitude, including second data to the data receiving device on one or more dedicated data lanes.

The data receiving device receives the modulated clock signal and the data signal via the clock and data lanes. The data receiving device retrieves the data from the modulated clock signal and the second data from the data signal. The data receiving device times the retrieval of the second data by utilizing the modulated clock signal.

DETAILED DESCRIPTION

Figure 1A:
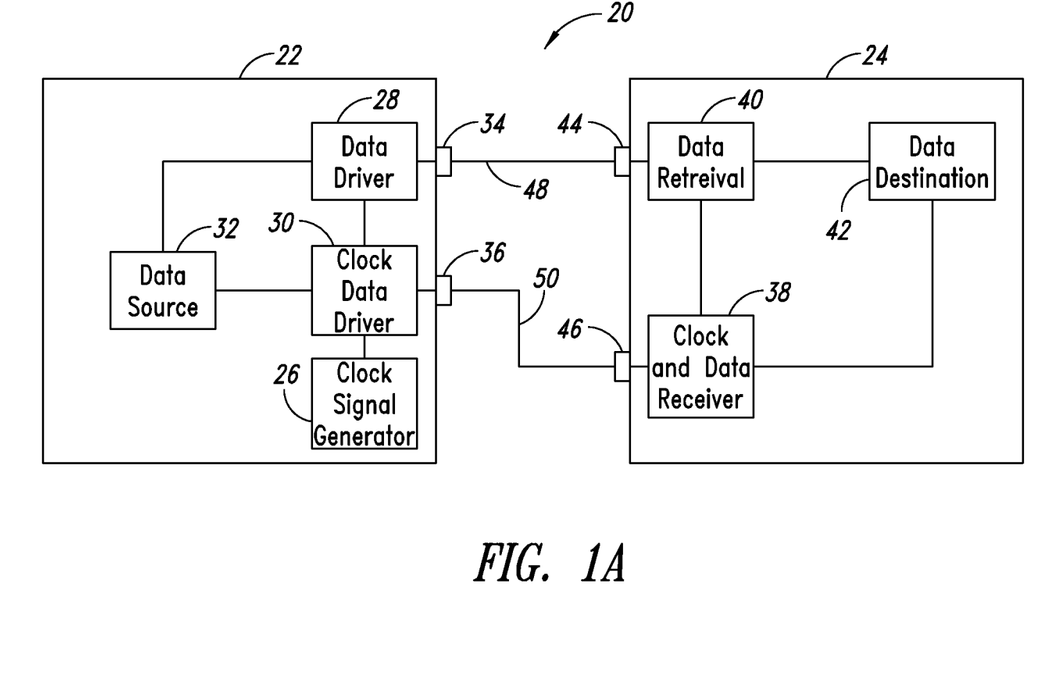
FIG. 1A is a block diagram of a data transmission system according to one embodiment.

FIG. 1A is a block diagram of a source synchronous data transmission system 20 according to one embodiment. The source synchronous data transmission system 20 includes a data transmitting device 22 and a data receiving device 24. The data transmission device includes a clock signal generator 26, a data driver 28 coupled to the clock signal generator 26, a clock data driver 30 coupled to the clock signal generator 26, and the data source 32 coupled to the clock signal generator 26, the data driver 28, and the clock data driver 30. The data transmission device 22 further includes a data output 34 coupled to the data driver 28 and a clock output 36 coupled to the clock data driver 30.

The data receiving device 24 includes a clock and data receiver 38, a data retrieval circuit 40 coupled to the clock and data receiver 38, and a memory 42 coupled to the clock and data receiver 38 and the data retrieval circuit 40. The data receiving device 24 further includes a data input 44 coupled to the data retrieval circuit 40, and a clock input 46 coupled to the clock and data receiver 38.

The system 20 includes a data transmission lane 48 and a clock transmission lane 50. The data transmission lane 48 is coupled between the data output 34 of the data transmitting device 22 and the data input 44 of the data receiving device 24. The clock transmission lane 50 is coupled between the clock output 36 of the data transmitting device 22 and the clock input 46 of the data receiving device 24.

The clock signal generator 26 of the data transmitting device 22 generates an oscillating clock signal. The clock signal has a particular frequency of oscillation, typically in a range between 100 MHz and 3 GHz, though frequencies outside this range can also be used. An example of the clock signal generated by the clock signal generator 26 is shown in the timing diagram of FIG. 2, discuss further below.

The clock signal generator 26 can be a any type of clock generation circuit of which many are well known in the art. The type of clock signal generator used is not material to the use of the inventive concept and can include, for example, a PLL, crystal oscillator, voltage controlled oscillator, current controlled oscillator, or any other type of clock oscillator that generates an oscillating signal suitable for use as a clock signal in an electronic circuit. Alternatively, the clock signal generator 26 can be a frequency multiplier/divider that receives an external clock signal from a separate clock signal generator external to the data transmitting device 22 and outputs a clock signal that has a frequency that is a multiple of the frequency of the external clock signal according to a multiplication/division factor. Additionally, the clock signal generator 26 can be a clock signal buffer that receives the external clock signal and output the clock signal having a same frequency as the external clock signal. The buffer can be considered a frequency multiplier with a multiplication factor of 1.

The clock data driver 30 receives the clock signal from the clock signal generator 26 and generates a modulated clock signal based on the clock signal and data to be encoded with the modulated clock signal. In particular, the clock data driver 30 generates the modulated clock signal by modulating an amplitude of the clock signal. The modulated clock signal has the same frequency as the clock signal, but the amplitude of the modulated clock signal varies based on first data that is encoded with the modulated clock signal. The modulated clock signal therefore carries both the clock signal and first data.

The clock data driver 30 receives first data from the data source 32 and encodes the first data into the modulated clock signal by modulating the amplitude of the clock signal. In one example, the clock data driver modulates the clock signal between one of two amplitudes. The lower amplitude can represent a digital "0", while the higher amplitude can represent a digital "1". While the amplitude of the modulated clock signal changes, the frequency of the modulated clock signal remains constant. The value of the data is based on the absolute value of the amplitude of the clock signal. Thus, the modulated clock signal can act as a reliable timing signal even though the amplitude of the modulated clock signal changes.

The data source 32 can be any acceptable source of data. In one embodiment, the data source 32 is a data storage device such as a flash memory array, a magnetic hard drive, an optical storage device, or other types of memory or data storage devices. Alternatively, the data source 32 can include one or more of a register, a shift register, a hard drive, a sensor signal, a FIFO, a RAM cache, or other types of temporary data storage. Further, the data source 32 can be a CPU or a camera sensor. The inventive concept is beneficial in sensors which have limited battery and output pins, one example of which is a camera in a cell phone or another device. The data sensed by the camera when picture is taken can be transferred from the camera sensor, usually a type of CCD, to a data destination 42 using just the clock pin alone, thus saving power and pin count on the chips. Or, the data can be transferred on two pins, one having just data and the other clock plus data, as shown in FIG. 1A. The clock pin can also operate as the data pin so that only a single output is provided from the sensor, with both clock and data on same pin, in some embodiments, see FIG. 1B.

The modulated clock signal is output to the data receiving device 24 via the clock output 36 and the clock lane 50. The data receiving device 24 receives the modulated clock signal at the clock input 46 and passes the modulated clock signal to the clock and data receiver 38. The data receiving device 24 uses the modulated clock signal as the timing signal for synchronizing the retrieval of data with the clock signal of the data transmission device 22 as is typical in source synchronous data links.

The source synchronous data transmission system 20 of FIG. 1A has a further advantage of also transmitting data on the dedicated clock lane 50. This is because the modulated clock signal includes data reflected in the changing absolute amplitude of the modulated clock signal. Therefore, the clock transmission lane 50 carries both the clock signal for the data receiving device 24, and data. An example of a modulated clock signal is shown in the timing diagram of FIG. 2, discussed further below.

In addition to the first data transmitted with the modulated clock signal, the data transmission device 22 also transmits second data to the data receiving device 24 on a dedicated data transmission lane 48 coupled between the data output 34 of the data transmitting device 22 and the data input 44 of the data receiving device 24. In particular, the data driver 28 retrieves second data from the data source 32 and transmits a data signal to the data receiving device 24 via the data output 34 and the data transmission lane 48. The data signal is encoded with the second data read from the data source 32.

The data receiving device 24 receives the data signal at the data input 44 and passes the data signal to the data retrieval circuit 40. The data retrieval circuit 40 also receives the modulated clock signal from the clock and data receiver 38. The data retrieval circuit 40 uses the modulated clock signal to synchronize with the data transmitting device 22, thereby enabling the data retrieval circuit 40 to properly retrieve the second data from the data signal. Additionally, the data retrieval circuit 40 retrieves the first data from the modulated clock signal. The data retrieval circuit 40 then passes the first and second data to the data destination 42.

In one embodiment, the data destination 42 is a data storage device such as a flash memory array, a magnetic hard drive, an optical storage device, or other types of data storage devices or memory. Alternatively, the data destination 42 can include one or more of a register, a shift register, a FIFO, a RAM cache, or other types of temporary data storage. The data destination 42 can be any circuit that receives data, such as an CPU, a controller, a DSP, or another device that makes use of data.

While a single data transmission lane 48 is shown with respect to FIG. 1A, in practice many data lanes 48 can be present, each of which can carry a separate data signal. In one example, seven data lanes 48 are present, which, when used with a clock signal that also carries data provides 8 bits transmitted at the same time. Thus, the seven dedicated data lanes 48 together with the clock lane 50 allow 8 bits to be transmitted on each edge of the modulated clock signal. This corresponds to a Word of data being read from the data source 32 and transmitted to the data receiving device 24 on each edge of the modulated clock signal. Those of skill in the art will recognize that and number of data lines can be use, many more than seven data lanes 48 can be present if desired. This permits one less pin to be use for data, which will be beneficial in many types of circuits.

Figure 1B:
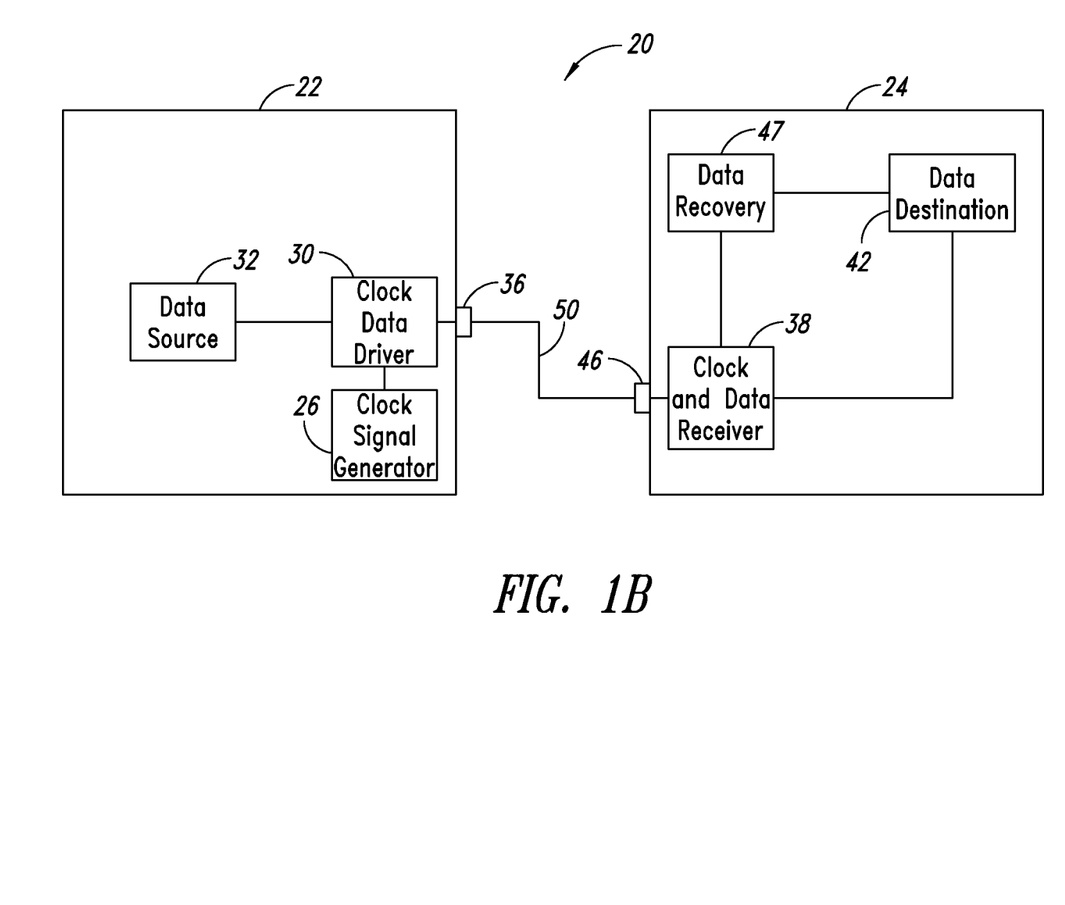
FIG. 1B is a block diagram of a data transmission system according to one embodiment

FIG. 1B is an embodiment in which only a clock and data signal line are provided. There is no separate data line. If desired, a separate data recovery circuit 47 can be provided as part of the system, or like FIG. 1A, the data can be recovered from the clock signal in the clock and data receiving circuit 38. FIG. 1B therefore provides an example of transfer circuit in which no data line is present. Rather, there is only a clock line. The value of the data to be transferred is embedded in the clock signal based on the absolute value of that clock signal.

Figure 2:
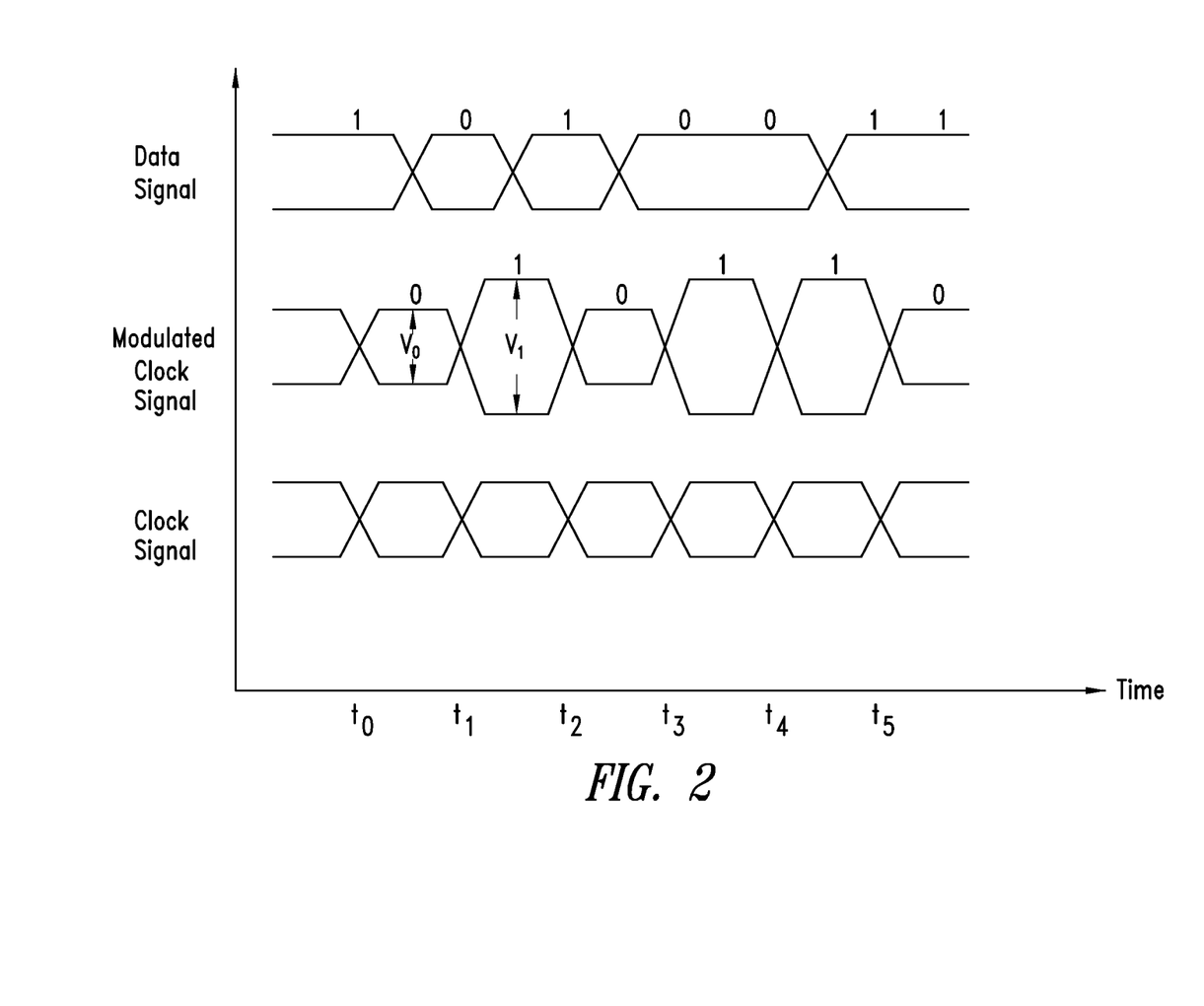
FIG. 2 is a timing diagram of the clock signal, the modulated clock signal and the data signal according to one embodiment.

FIG. 2 is a timing diagram illustrating a clock signal, a modulated clock signal and a data signal according to one embodiment. In the example of FIG. 2, each signal includes a two complimentary voltage signals. Transmitting data and clock signals in this manner allows for increased reliability in accurately receiving the data and clock signals. However, those of skill in the art will recognize that each signal may include only a single voltage signal.

The clock signal, generated by the clock signal generator 26 of FIG. 1A, oscillates at a fixed frequency and has a fixed amplitude. At time $T_0$ the clock signal has an edge event in which both voltage signals transition from high to low or low to high. Each edge event can be considered a rising or falling edge of the clock signal depending on which voltage signal is analyzed. For example, if we refer to the voltage signal that is at the high value before time $T_0$ as the first voltage signal and the bottom signal as the second voltage signal, then it time $T_0$ a falling edge of the first voltage signal occurs, while a rising edge of the second voltage signal occurs. At time $T_1$ the first voltage signal has a rising edge in which the first voltage signal goes from the low value to the high-value. At time $T_2$ the first voltage signal has a falling edge event. The time elapsed between $T_0$ and $T_2$ is a full period T of oscillation of the clock signal. The frequency f of the clock signal is the inverse of the period T, or f=1/T. The frequency f of the clock signal of FIG. 2 is, for example, 500 MHz. The data signal is a double data rate DDR data signal. This means that a bit of data is transmitted with each edge of the clock signal. Thus, two bits of data can be transmitted on the data signal with each clock period T. In FIG. 2, the data signal is transmitted such that transitions in the data signal occur between transitions of the clock signal. The data edges and the clock edges keep a quadrature relation to maintain enough setup and hold time at the receiver end for the data lanes. However, it is not mandatory that the clock edges and data edges keep a quadrature relationship. The clock edge at the receiver can also be adjusted by several techniques known to clock in the data. The explanation and signal arrangement with respect to the quadrature related DDR data & clock has been provided as one example.

Each transition in the data signal corresponds to the value of the current bit changing from the previous value. For example, at time $T_0$ the current bit of the data signal is a logical "1". After $T_0$, a transition in the data signal occurs, indicating that the current bit is the opposite of the previous bit, a logical "0". After $T_1$, the data signal again transitions indicating that the current bit is the opposite of the previous bit, now a logical "1". After $T_2$ a transition in the data signal occurs indicating that the current bit is now "0". After time $T_3$, no transition occurs in the data signal indicating that the current bit is still "0". After time $T_4$ a transition in the data signal occurs indicating that the current bit is "1". The transition does not occur after time $T_5$, therefore indicating that the current bit is still "1".

The modulated clock signal oscillates at the same frequency as the clock signal. Each transition in the clock signal corresponds to a transition in the modulated clock signal. However, the absolute value of the amplitude of the modulated clock signal can have either a first value $V_0$ or a second value $V_1$. The value of the amplitude of the modulated clock signal indicates a particular bit of data. An example of FIG. 2, the smaller amplitude $V_0$ indicates a logical "0" while the higher amplitude $V_1$ indicates a logical "1". Thus, not only does the modulated clock signal oscillate in accordance with the clock signal, but it also carries data.

Between times $T_0$ and $T_1$, the amplitude of the modulated clock signal is $V_0$, indicating a logical "0". At time $T_1$ the modulated clock signal transitions to amplitude $V_1$, indicating a logical "1". At time $T_2$, the modulated clock signal transitions back to amplitude $V_0$, indicating a logical "0". At time $T_3$ the modulated clock signal transitions to amplitude $V_1$, indicating a logical "1". At time $T_4$ the amplitude of the modulated clock signal remains at $V_1$, indicating a logical "1". At time $T_5$ the modulated clock signal transitions to amplitude $V_0$, indicating a logical "0".

As can be seen from FIG. 2, the modulated clock signal is a DDR data carrying clock signal. Each transition of the modulated clock signal corresponds to a new bit of data. Thus, each oscillation period T of the modulated clock signal carries two bits of data.

Figure 3:
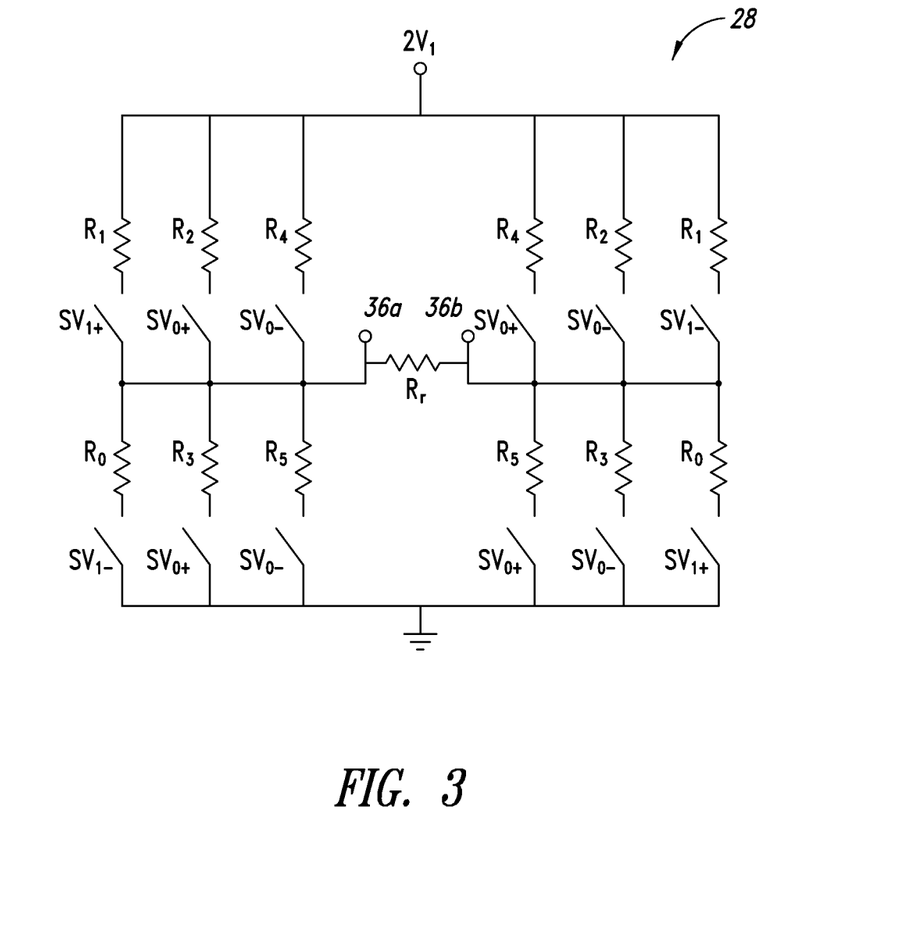
FIG. 3 is a schematic diagram of the clock driver circuit according to one embodiment.

FIG. 3 is systematic diagram of the clock data driver 28 according to one embodiment. This is one possible example for use of the present invention. The clock data driver 28 is coupled between two power supply rails, $2V_1$ and ground. A plurality of resistors having values $R_1$, $R_2$, or $R_4$ are coupled between the high voltage supply $2V_1$ and a respective first switch $SV_1+$, $SV_1-$, $SV_0+$ or $SV_0-$. A plurality of resistors having values $R_0$, $R_3$, and $R_5$ are coupled between an output pin 36a/36b and a respective second switch $SV_1+$, $SV_1-$, $SV_0+$ or $SV_0-$. The second switches are coupled to ground. The resistor $R_r$ is a resistance associated with the receiving device 24 as a termination resistor and, while not part of the clock data driver 28, is shown to better illustrate the amplitude of the modulated clock signal as received at the clock and data receiver 38 of the data receiving device 24. Rr=100Ω. The example values of the resistor R1=R0=50Ω. R2∥R3=R4∥R5=50Ω. 2*$V_1$ is, for example 400 mV.

The clock data driver 28 generates the modulated clock signal on the outputs 36a, 36b by selectively opening and closing the switches $SV1_+$, $SV1_-$, $SV0_+$, $SV0_-$ in a particular manner in synchronization with the clock signal generated by the clock signal generator 26. In this manner, the voltage difference between outputs 36a, 36b is modulated between the values $V_0$ and $V_1$ and has a frequency of oscillation identical to the clock signal.

In one embodiment, when a digital "1" is to be encoded into the modulated clock signal, all switches $SV_1+$ are closed in one half cycle of the modulated clock signal while all switches $SV_1-$ are open. In the next half cycle, all switches $SV1+$ are opened and all switches $SV_1-$ are closed. Thus, when the value of the data in the modulated clock signal is "1", the switches $SV_{1+}$ and $SV_{1-}$ are alternately opened and closed with each edge event. Meanwhile, $SV0_+$ and $SV_{0-}$ are opened while a digital "1" is encoded in the modulated clock signal. This causes the amplitude of the voltage between the output pins 36a, 36b to be $V_1$, with the polarity switching after each half cycle (i.e. with each edge event) of the clock signal.

In one embodiment, when a digital "0" is to be encoded into the modulated clock signal, all switches $SV_0+$ are closed in one half cycle of the modulated clock signal while all switches $SV_0-$ are open. In the next half cycle, all switches $SV_0+$ are opened and all switches $SV_0-$ are closed. Thus, when the value of the data in the modulated clock signal is "0", the switches $SV_0+$ and $SV_{0-}$ are alternately opened and closed with each edge event. Meanwhile, $SV_{1+}$ and $SV_{1-}$ are continually held open when a digital "0" is encoded in the modulated clock signal. This causes the amplitude of the voltage between the output pins 36a, 36b to be $V_0$, with the polarity switching after each half cycle (ie with each edge event) of the clock signal. The value of $V_0$ is half the value of $V_1$, or about 100 mV.

Figure 4:
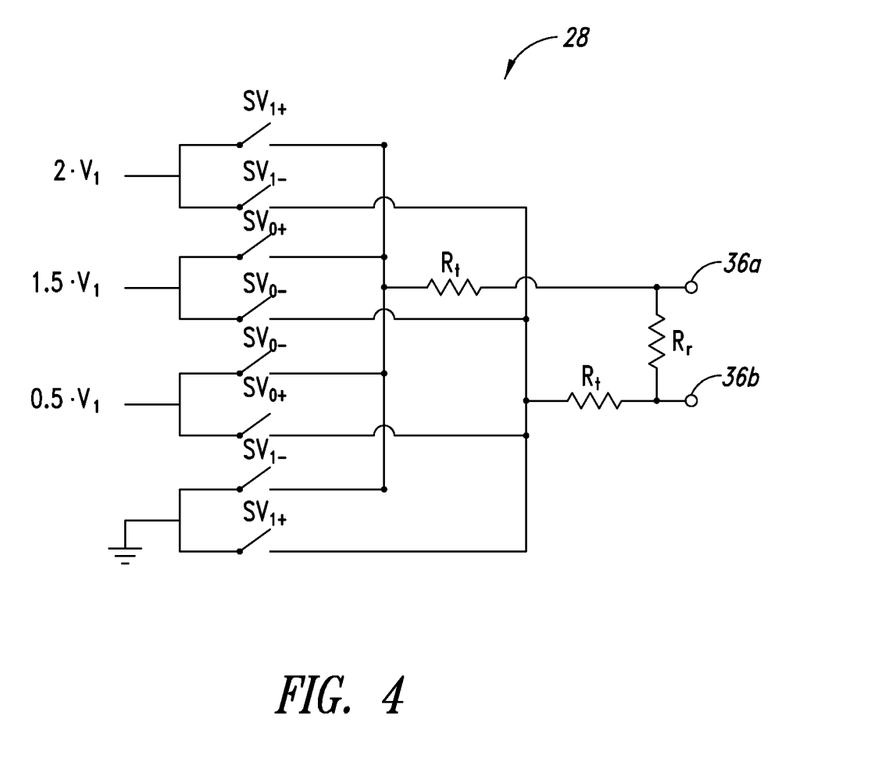
FIG. 4 is a schematic diagram of a clock driver circuit according to an alternate embodiment.

FIG. 4 is a schematic diagram of the clock data driver 28 according to one embodiment. The clock data driver 28 of FIG. 4 includes four supply voltages $2V_1$, $1.5V_1$, $0.5V_1$, selectively coupled between output pins 36a, 36b by respective switches. In particular, the supply voltage $2V_1$ is coupled to the output pin 36a by a first switch $SV_{1+}$. The supply voltage $2V_1$ is coupled to the output pin 36b by first switch $SV_{1-}$. The supply voltage 1.5 $V_1$ is coupled to the output pin 36a by a first switch SV0+. The supply voltage 1.5 V1 is coupled to the output pin 36b by a first switch SV0−. The supply voltage 0.5V1 is coupled to the output pin 36a by a second switch SV0−. The supply voltage 0.5 V1 is coupled to the output pin 36b by a second switch SV0+. The supply voltage ground is coupled to the output pin 36a by a second switch SV1−. The supply voltage ground is coupled to the output pin 36b by a second switch SV1+. The resistors $R_t$ are resistances associated with the data transmitting device 22. $R_t$=50Ω. The resistor $R_r$ is a resistance associated with the receiving device 24 and, while not part of the clock data driver 28, is shown to better illustrate the amplitude of the modulated clock signal as received at the clock and data receiver 38 of the data receiving device 24. $R_r$=100Ω.

In one embodiment, when a digital "1" is to be encoded into the modulated clock signal, all switches $SV_1$+ are closed in one half cycle of the modulated clock signal while all switches $SV_{1-}$ are open. In the next half cycle, all switches SV1+ are opened and all switches $SV_{1-}$ are closed. Thus, when the value of the data in the modulated clock signal is "1", the switches $SV_{1+}$ and $SV_{1-}$ are alternately opened and closed with each edge event. Meanwhile, $SV0_+$ and $SV_{0-}$ are opened while a digital "1" is encoded in the modulated clock signal. This causes the amplitude of the voltage between the output pins 36a, 36b to be $V_1$, with the polarity switching after each half cycle (ie with each edge event) of the clock signal.

In one embodiment, when a digital "0" is to be encoded into the modulated clock signal, all switches $SV_0$+ are closed in one half cycle of the modulated clock signal while all switches $SV_{0-}$ are open. In the next half cycle, all switches $SV_0$+ are opened and all switches $SV_{0-}$ are closed. Thus, when the value of the data in the modulated clock signal is "0", the switches $SV_0$+ and $SV_{0-}$ are alternately opened and closed with each edge event. Meanwhile, $SV_{1+}$ and $SV_{1-}$ are continually held open when a digital "0" is encoded in the modulated clock signal. This causes the amplitude of the voltage between the output pins 36a, 36b to be $V_0$, with the polarity switching after each half cycle (ie with each edge event) of the clock signal. The value of $V_0$ is half the value of $V_1$, or about 100 mV.

Figure 5:
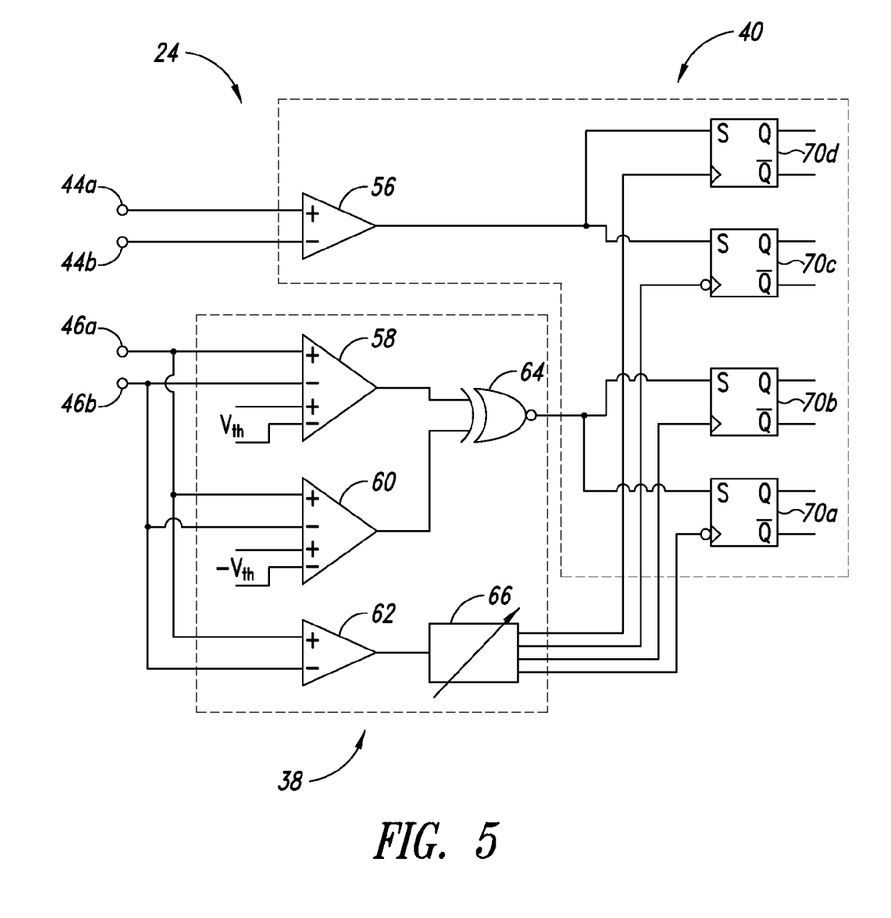
FIG. 5 is a schematic diagram of a data receiving device according to one embodiment.

FIG. 5 is an example schematic diagram of a data receiving device 24 according to one embodiment. The data receiving device 24 includes a clock and data receiver 38 and a data retrieval circuit 40 coupled to the clock and data receiver 38. The clock and data receiver 38 is coupled to clock inputs 46a, 46b. The data retrieval circuit 40 is coupled to data inputs 44a, 44b.

The clock and data receiver 38 includes a first differential difference amplifier 58, a second differential difference amplifier 60, a comparator 62, an XOR gate 64, and a delay circuit 66. The clock input pins 46a, 46b receive the modulated clock signal from the data transmission device 22 via the dedicated clock Lane 50. In particular, the modulated clock signal is received in two complementary signals on the clock input pins 46a, 46b. As described previously, the modulated clock signal can have one of two amplitudes. When the modulated clock signal has amplitude $V_1$, the voltage difference between the clock inputs 46a, 46b is $V_1$. When the modulated clock signal has amplitude $V_0$, the voltage difference between the clock inputs 46a, 46b is $V_0$, approximately half of $V_1$. In one embodiment, $V_1$=200 mV and $V_0$ equals 100 mV.

The first differential difference amplifier 58 has four signal inputs, an upper non-inverting input +, an upper inverting input −, a lower non-inverting input +, and a lower inverting input −. The modulated clock signal is passed from the clock inputs 46a, 46b to the upper inverting and non-inverting inputs of the first differential difference amplifier 58. A threshold voltage $V_{th}$ is provided between the lower non-inverting and inverting inputs of the first differential difference amplifier 58. The absolute value of the threshold voltage $V_{th}$ is between $V_0$ and $V_1$ and has a value selected so that the first differential difference amplifier 58 can reliably detect whether the modulated clock signal is at $V_1$ or $V_0$.

The first differential difference amplifier 58 outputs a high voltage, or logical "1", if the voltage difference between the input pin 46a and 46b is greater than $V_{th}$ and positive. The first differential difference amplifier 58 outputs a low-voltage, or logical "0", for all other cases.

The second differential difference amplifier 60 is configured similar to the first differential difference amplifier 58 except that a threshold voltage $-V_{th}$ is received between the lower non-inverting and inverting inputs of the differential difference amplifier 60. The second differential difference amplifier 60 outputs a high voltage, or logical "1", if the voltage difference between the input pin 46a and 46b is greater in magnitude than $V_{th}$ and negative. The second differential difference amplifier 60 outputs a low voltage, or logical "0", for all other cases.

The first and second differential difference amplifiers 58, 60 each provide their outputs to a respective input of the XOR gate 64. If either of the outputs of the differential difference amplifier 58, 60 is high, then the XOR gate 64 outputs a high voltage or logical "1". If both of the outputs of the differential difference amplifier's 58, 60 are low, then the XOR gate 64 outputs a low-voltage or logical "0". The output of the XOR gate 64 is indicative of the data encoded into the modulated clock signal. The XOR gate 64 passes its output to the data retrieval circuit 40.

The modulated clock signal is also passed from the clock inputs 46a, 46b to the comparator 62. The comparator 62 outputs a high voltage, or logical "one" if the voltage at the non-inverting input is greater than the voltage on the inverting input. The comparator 62 outputs a low-voltage, or logical "0" if the voltage at the non-inverting input is less than the voltage on the inverting input. The output of the comparator 62 reflects the clock signal without amplitude modulation because the comparator 62 only outputs a logical high or a logical low.

The output of the comparator 62 is passed to a variable delay circuit 66 which introduces a selected delay into the clock signal output from the comparator 62 in order to properly synchronize the data retrieving circuit 40 with the data received by the data receiving device 24. The output of the variable delay circuit 66 is the clock signal by which the data retrieval circuit 40 is synchronized to the data transmitting device 22. In one embodiment, the variable delay circuit 66 includes a plurality of buffer circuits connected in series. The number of buffer circuits active in the series can be increased or decreased to increase or decrease the delay by operating switches coupled to the buffer circuit 66.

In one embodiment, the proper delay can be calibrated by encoding only "0s" into the modulated clock signal while sending a stream of training data on the data lane 48. The delay circuit 66 can be adjusted until data signal is properly synchronized with the modulated clock signal.

The data retrieval circuit 40 includes a comparator 56 coupled to data inputs 44a, 44b which receive the data signal from the data transmission device 22 via the data Lane 48. The comparator 56 outputs a high voltage, or logical "1" if the voltage at the non-inverting input is greater than the voltage on the inverting input. The comparator 62 outputs a low-voltage, or logical "0" if the voltage at the non-inverting input is less than the voltage on the inverting input. The output of the comparator 56 is indicative of the data encoded in the data signal. The output of the comparator 56 will remain constant until a new data value is received.

The output of the comparator 56 passed to the set inputs S of two flip-flops 70c, 70d. The flip-flops 70c, 70d also receive on their clock inputs the output of the variable delay circuit 66. In one embodiment, the variable delay clock circuit provides a different delay for different channels of data to deskew data and clock the proper amounts. This is illustrated in the figure as a separate output from variable delay circuit 66, but it can also be realized by having a different variable delay circuit 66 for each channel. The clock input of the flip-flop 70c is inverted with respect to the clock input of the flip-flop 70d. The outputs Q of the flip-flops 70d, 70c correspond to the retrieve data from the data signal. The outputs $\overline{Q}$ of the flip-flops 70c, 70d are the logical opposites of the outputs Q of the flip-flops 70 D, 70 C The output of the XOR gate 64 is passed to the set inputs S of two flip-flops 70a, 70b. The flip-flops 70a, 70b also receive on their clock inputs the output of the variable delay circuit 66. The clock input of the flip-flop 70a is inverted with respect to the clock input of the flip-flop 70b. The outputs Q of the flip-flops 70a, 70b correspond to the retrieved data from the modulated clock signal. The outs $\overline{Q}$ of the flip-flops 70a, 70b are the logical opposites of the outputs Q of the flip-flops 70a, 70b.

To ensure reliable retrieval of the first data from the modulated clock signal, in one embodiment the threshold voltage $V_{th}$ can be calibrated to ensure reliable detection of amplitudes $V_0$ and $V_1$ of the of the modulated clock signal. In one example, during a calibration process the clock data driver 28 can encode 1-0-1-0 into the modulated clock signal. The data receiving device 24 can adjust the threshold voltage $V_{th}$ until the data retrieval circuit 40 can reliably detect 1-0-1-0 in the modulated clock signal. The data receiving device 24 can include a digital-to-analog converter to generate and incrementally adjust $V_{th}$ during calibration.

Figure 6:
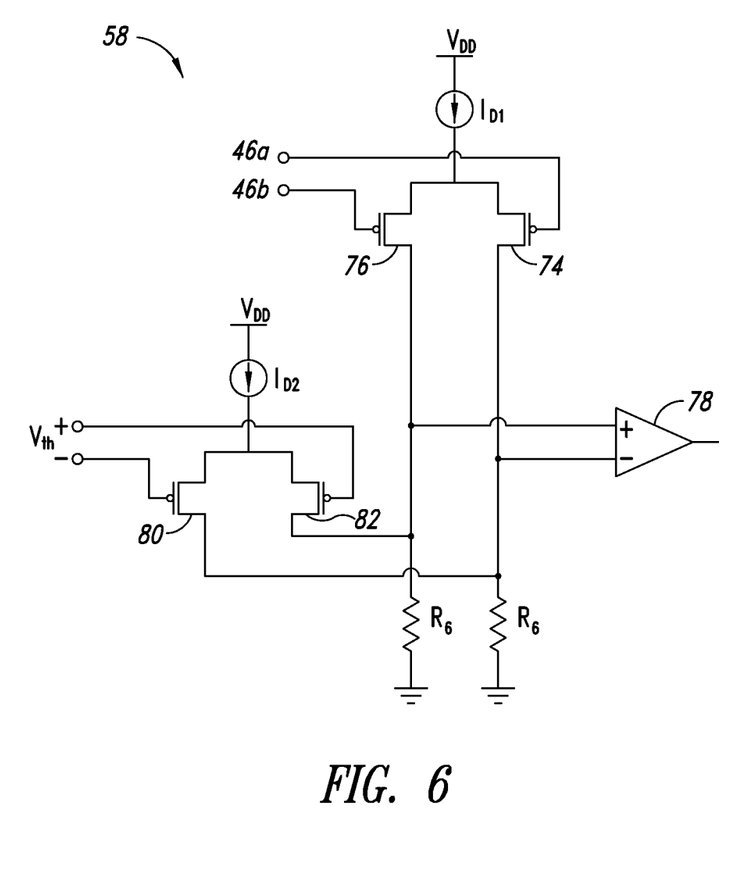
FIG. 6 is a schematic diagram of a differential difference amplifier from the data receiving device according to one embodiment.

FIG. 6 is a schematic diagram of one example of the differential difference amplifier 58 of FIG. 5 according to one embodiment. The differential difference amplifier 58 includes a pair PMOS transistor 74, 76 each receiving on its source terminal the output of a current source $I_{D1}$. The gate terminal of the transistor 74 is coupled to the clock input 46a, while the gate terminal of the transistor 76 is coupled to the clock input 46b. The drain terminal of the transistor 74 is coupled to the inverting input of the comparator 78. The drain terminal of the transistor 76 is coupled to the non-inverting input of the comparator 78. Two resistors R6 are coupled between ground and a respective input of the comparator 78. The differential difference amplifier 58 further includes a second pair of PMOS transistors 80, 82. The source terminals of the transistors 80, 82 are coupled to a second current source $I_{D2}$. The gate terminals of the transistors 80, 82 receive $V_{th}$ between them.

The first differential difference amplifier 58 outputs a high voltage, or logical "1", if the voltage difference between the input pin 46a and 46b (V46a-V46b) is greater than $V_{th}$ and positive. The first differential difference amplifier 58 outputs a low voltage, or logical "0", for all other cases.

Though not shown in the Figures, the second differential difference amplifier 60 can be substantially identical to the first differential difference amplifier 58 except that $-V_{th}$ is applied between the equivalents of transistors 80, 82.

Figure 7:
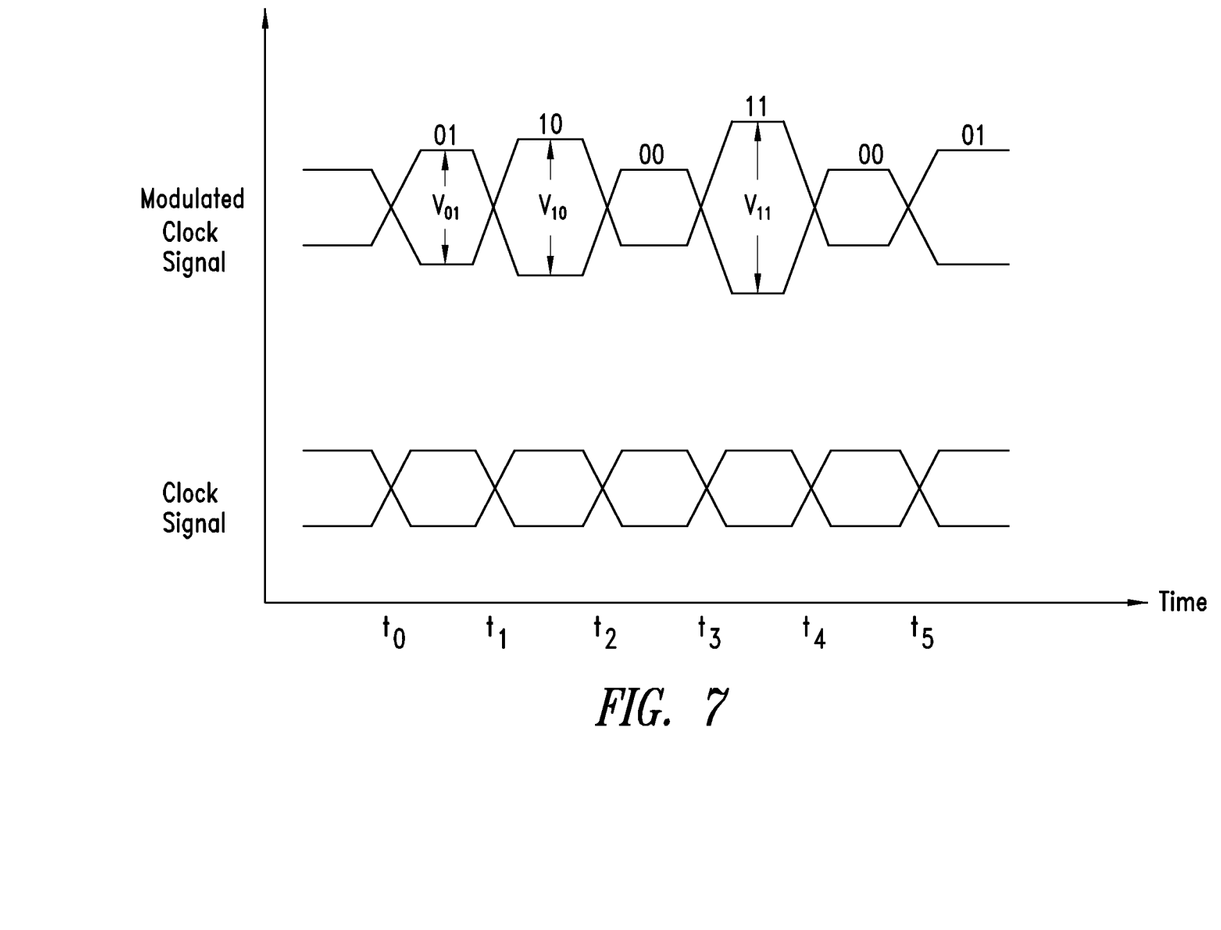
FIG. 7 is a timing diagram of a clock signal and the modulated clock signal according to one embodiment.

FIG. 7 is a timing diagram showing a clock signal and a modulated clock signal according to one embodiment. In particular, the timing diagram of FIG. 7 illustrates that the modulated clock signal can carry multiple bits per half cycle. For example, the clock data driver 28 can modulate the amplitude of the modulated clock signal between one of four amplitudes, $V_{00}$, $V_{01}$, $V_{10}$, $V_{11}$ as shown in FIG. 7. This is type of signal is different from a standard pulse amplitude modulation signal, where positive and negative amplitudes with same absolute value is considered two different symbols. In the embodiments descried herein, V00, V11 etc. carries symbols as per the absolute values of the clock, i.e., differential negative or positive. Thus, V00 will mean the same symbol, so on. Toggling of positive and negative differential value is to carry clock edge information only.

At time $T_0$, the amplitude of the modulated clock signal transitions to amplitude $V_{01}$, indicating that the current data bits have digital value "01". At time $T_1$, the amplitude of the modulated clock signal transitions to amplitude $V_{10}$, indicating that the current data bits have digital value "10". V10 is greater than $V_{01}$. At time $T_2$, the amplitude of the modulated clock signal transitions to amplitude $V_{00}$, indicating that the current data bits have digital value "00". $V_{00}$ is less than $V_{01}$. At time $T_3$, the amplitude of the modulated clock signal transitions to amplitude $V_{11}$, indicating that the current data bits have digital value "11". $V_{11}$ is less than $V_{10}$. At time $T_4$, the amplitude of the modulated clock signal transitions to amplitude $V_{00}$, indicating that the current data bits have digital value "00". At time $T_5$, the amplitude of the modulated clock signal transitions to amplitude $V_{01}$, indicating that the current data bits have digital value "01". The reception also happens similarly with multiple decision thresholds. Those of skill in the art will understand, in light of the present disclosure, that more than two bits can be included in each half cycle of the modulated clock signal.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A source synchronous data transferring device comprising:
    a data transmitting device including:
        a clock signal generator that generates a clock signal;
        a data source;
        a first driver coupled to the data source and to an output of the clock signal generator, the first driver configured to receive first data from the data source and to output a modulated clock signal that is based on the clock signal and encodes the first data into the modulated clock signal by modulating an absolute value of an amplitude of the clock signal based on a value of the first data, the first driver modulates the amplitude of the clock signal between a first threshold value and a second threshold value, the first and second threshold values representing respective data values of the first data;
   a clock output coupled to the first driver that provides the modulated clock signal; and
   a second driver coupled to the data source and configured to receive second data from the data source, the second driver having a data output that outputs the second data, the clock output and the data output being separate outputs.

2. The source synchronous data transferring device of claim 1 wherein both a rising edge and a falling edge of a clock cycle of the modulated clock signal indicate individual bits of the first data.

3. The source synchronous data transferring device of claim 1 wherein the clock signal generator is a clock multiplier.

4. The source synchronous data transferring device of claim 1 wherein the clock signal generator is clock buffer.

5. A source synchronous data transferring device comprising:
   a clock signal generator that generates a clock signal;
   a first driver coupled to the output of the clock signal generator and receives the clock signal, the first driver outputs a modulated clock signal that is based on the clock signal and encodes first data into the modulated clock signal by modulating an absolute value of an amplitude of the clock signal based on a value of the first data; and
   a clock output coupled to the first driver that provides the modulated clock signal,
   wherein the first driver modulates the amplitude of the clock signal between a first threshold value and a second threshold value, wherein the first and second threshold values each represent respective data values of the first data.

6. The source synchronous data transferring device of claim 5 comprising a second driver having a data output that outputs second data.

7. The source synchronous data transferring device of claim 6 comprising a data source coupled to the first and second drivers, wherein the first and second data are retrieved from the data source.

8. A source synchronous data transferring device comprising:
   a clock signal generator that generates a clock signal;
   a first driver coupled to the output of the clock signal generator and that receives the clock signal, the first driver outputs a modulated clock signal that is based on the clock signal and encodes first data into the modulated clock signal by modulating an absolute value of an amplitude of the clock signal based on a value of the first data; and
   a clock output coupled to the first driver that provides the modulated clock signal,
   wherein the first driver modulates the amplitude of the clock signal between at least four different threshold values, each threshold value representing a respective data value of the first data.

9. The source synchronous data transferring device of claim 8 comprising a second driver having a data output that outputs second data.

10. The source synchronous data transferring device of claim 9 comprising a data source coupled to the first and second drivers, wherein the first and second data are retrieved from the data source.

11. A method comprising:
   generating a first clock signal in a data transmitting device;
   receiving, by a first driver in the data transmitting device, first data from a data source in the data transmitting device;
   generating a modulated clock signal, by the first driver, and encoding the first data in the modulated clock signal by modulating an absolute value of an amplitude of the first clock signal between a first threshold value and a second threshold value, the first and second threshold values representing respective data values of the first data;
   outputting the modulated clock signal from a clock output of the data transmitting device;
   receiving, by a second driver in the data transmitting device, second data from the data source in the data transmitting device; and
   outputting a data signal from a data output of the second driver in the data transmitting device, the data signal including the second data, the clock output and the data output being separate outputs.

12. The method of claim 11 comprising:
   providing the modulated clock signal to a comparator of a data receiving device; and
   outputting a normalized clock signal from the comparator, the normalized clock signal having a constant amplitude and a same frequency as the modulated clock signal.

13. A method comprising:
   generating a first clock signal in a data transmitting device;
   generating a modulated clock signal in the data transmitting device based on the first clock signal;
   encoding first data in the modulated clock signal by modulating an absolute value of an amplitude of the first clock signal;
   outputting the modulated clock signal from a clock output of the data transmitting device;
   outputting a data signal from a data output of the data transmitting device, the data signal including second data;
   receiving in a clock input of a data receiving device the modulated clock signal from the clock output;
   retrieving in the data receiving device the first data from the modulated clock signal;
   receiving in a data input of the data receiving device the data signal; and
   retrieving in the data receiving device the second data from the data signal.

14. The method of claim 13 comprising:
   providing the modulated clock signal to a comparator of the data receiving device; and
   outputting a normalized clock signal from the comparator, the normalized clock signal having a constant amplitude and a same frequency as the modulated clock signal.

15. The method of claim 14 comprising:
   providing the normalized clock signal to respective clock inputs of a plurality of flip-flops of the data receiving device;

providing the data signal, or a processed data signal derived from the data signal, to a first flip-flop of the plurality of flip-flops;

providing the modulated clock signal, or a processed clock data signal derived from the modulated clock signal, to a second flip-flop of the plurality of flip-flops; and retrieving the first and second data from the first and second flip-flops, respectively.

16. The method of claim 15 comprising:

generating the processed data signal by supplying the first signal to a second comparator; and generating the processed clock data signal by passing the modulated clock signal to a differential difference amplifier.

17. A system comprising:

a data transfer device including:
- a clock signal generator configured to generate a clock signal;
- a driver configured to receive the clock signal and to generate a modulated clock signal based on the clock signal;
- a clock output coupled to the driver and configured to output the modulated clock signal; and
- a data output configured to output a data signal;

a data receiving device comprising:
- a clock input coupled to the clock output of the data transfer device and configured to receive the modulated clock signal from the clock output; and
- a data input coupled to the data output of the data transfer device and configured to receive the data signal from the data output of the data transfer device, the data receiving device configured to retrieve first data from the modulated clock signal and second data from the data signal.

18. The system of claim 17 wherein the data transfer device and the data receiving device are respective integrated circuit dies.

19. The system of claim 18 wherein the data transfer device and the data receiving device are each positioned on a same printed circuit board.

20. The system of claim 17 wherein the data receiving device is configured to use the modulated clock signal, or a normalized clock signal derived from the modulated clock signal, as a master clock signal in retrieving the first and second data.

21. The system of claim 17 wherein the modulated clock signal includes multiple bits of the first data in each clock cycle of the modulated clock signal based on multiple absolute values of the amplitude.

22. The system of claim 21 wherein the modulated clock signal includes multiple bits of the first data in each half clock cycle of the modulated clock signal based on multiple decision thresholds for data values.

23. The system of claim 17 wherein the data transfer device includes a data driver configured to generate the data signal and to output the data signal to the data output.

* * * * *